United States Patent [19]

Schultz

[11] Patent Number: 4,576,770

[45] Date of Patent: Mar. 18, 1986

[54] METHOD OF MANUFACTURING A TURBOMACHINERY ROTOR

[75] Inventor: Frederick E. Schultz, Exmore, Va.

[73] Assignee: General Electric Co., Philadelphia, Pa.

[21] Appl. No.: 543,277

[22] Filed: Oct. 19, 1983

Related U.S. Application Data

[62] Division of Ser. No. 364,211, Apr. 1, 1982, Pat. No. 4,464,097.

[51] Int. Cl.[4] .............................................. B29D 3/02
[52] U.S. Cl. ......................... 264/103; 264/29.2; 264/29.5; 264/59; 264/60; 264/81; 264/129; 264/258; 264/262; 264/317
[58] Field of Search .................... 264/60, 317, 59, 81, 264/103, 129, 258, 261, 262, 29.1, 29.2, 29.5; 416/229 A, 230; 156/148, 169

[56] References Cited

U.S. PATENT DOCUMENTS

| | | | |
|---|---|---|---|
| 2,857,094 | 10/1958 | Erwin | 416/230 |
| 3,112,184 | 11/1963 | Hollenbach | 264/317 |
| 3,403,844 | 10/1968 | Stoffer | 416/230 |
| 3,501,090 | 3/1970 | Stoffer et al. | 416/189 |
| 3,619,448 | 11/1971 | Palfreyman | 264/317 |
| 3,671,139 | 6/1972 | Plowman | 416/61 |
| 3,883,267 | 5/1975 | Baudier et al. | 416/230 |
| 3,895,084 | 7/1975 | Bauer | 264/81 X |
| 3,966,522 | 6/1976 | Hatch | 264/317 |
| 3,993,817 | 11/1976 | Schultz | 156/148 X |
| 4,052,913 | 10/1977 | Schultz et al. | 416/230 X |
| 4,063,684 | 12/1977 | O'Brien et al. | 239/265.11 |
| 4,123,832 | 11/1978 | Schultz | 156/148 X |
| 4,252,588 | 2/1981 | Kratsch et al. | 264/69 X |
| 4,318,948 | 3/1982 | Hodgson | 264/81 X |
| 4,341,830 | 7/1982 | Betts et al. | 264/29.2 X |
| 4,363,602 | 12/1982 | Martin | 416/230 |

FOREIGN PATENT DOCUMENTS 2004855 4/1979 United Kingdom .............. 264/29.5

*Primary Examiner*—Jan Silbaugh
*Attorney, Agent, or Firm*—Allen E. Amgott

[57] ABSTRACT

A composite, single material, one-piece turbomachinery rotor constructed of fibers bonded in a matrix is disclosed together with a method of manufacture thereof.

6 Claims, 5 Drawing Figures

METHOD OF MANUFACTURING A TURBOMACHINERY ROTOR

BACKGROUND OF THE INVENTION

This is a division of co-pending U.S. application Ser. No. 364,211—Schultz filed Apr. 1, 1982, which issued as U.S. Pat. No. 4,464,097 on Aug. 7, 1984 and assigned to the assignee of the instant application.

The present invention relates to turbomachinery rotors and, more particularly, to new and improved one-piece, single material turbomachinery rotors especially adapted for use under extreme conditions such as high rotational velocity, high impulse shock and high temperature encountered in jet engines, and a new and improved method of rotor manufacture.

Turbomachinery rotors utilized in jet engines are usually subjected to harsh extremes of environmental conditions. Temperatures encountered may reach in excess of 2500° F. inducing thermal stresses and thermal degradation of rotor materials; rotational velocities can exceed 65,000 rpm, subjecting rotor materials to large centrifugal forces; and fuel combustion in such engines is frequently initiated by detonation of an explosive charge, subjecting rotor materials to high impulse forces.

One type of turbomachinery rotor used under such extreme conditions is commonly constructed of costly, scarce, and strategic metals and is formed in a series of unusually complicated milling operations to provide a desired shape, including numerous intricate passageways for conducting a cooling fluid throughout the rotor. Another type of turbomachinery rotor used under such extreme conditions is constructed of composite materials, such as fiber-matrix composites, to obtain sufficient structural integrity and durability. Frequently, the fibers are formed of materials such as graphite, steel, boron, or glass in order to obtain tensile strength, and shear strength is obtained by bonding the fibers in a matrix composed of, for example, a polymer resin or a metal. Fabrication of such rotors also requires complex and exacting manufacturing procedures.

OBJECTS OF THE INVENTION

An object of the present invention is to provide a new and improved turbomachinery rotor of one-piece construction.

Another object of the present invention is to provide a new and improved composite material turbomachinery rotor constructed of a single substance.

Another object of the present invention is to provide a new and improved composite material turbomachinery rotor which is capable of withstanding a high temperature environment such as is found in a jet engine.

Another object of the present invention is to provide a new and improved composite material turbomachinery rotor structure which is structurally capable of withstanding a high temperature environment of the order of 3500° F., such as are found in jet engine inlet temperatures and which avoids the use of strategic metals, avoids or reduces the requirement of fluid cooling passages, and yields significant performance improvement.

Another object of the present invention is to provide a new and improved composite material turbomachinery rotor capable of withstanding the stresses of high rotational velocity as is required in the operation of a jet engine.

Another object of the present invention is to provide a new and improved composite material turbomachinery rotor which is capable of withstanding high impulse shocks such as are imparted in a jet engine when ignition is obtained by detonation of an explosive charge.

Still another object of the present invention is to provide a new and improved method of manufacturing a one-piece, single material composite turbomachinery rotor.

SUMMARY OF THE INVENTION

The foregoing objects as well as other objects are achieved by the present invention wherein a refractory turbomachinery rotor is manufactured from a network of fibers bonded in a matrix. A radial array of fibers is arranged in a starburst pattern centered upon a central paper disc and framed and supported by a rigid annular ring which axially surrounds the central paper disc. The starburst pattern is formed on the ring in a loading fixture where the fiber spacing and blade curvature are determined. Several such arrays are stacked in the axial direction and stabilized by three roller supports located at the ring's periphery. The array is placed in a loom where a shaft is inserted through the paper discs. Cylindrical mold sections are now placed over the shaft. These mold sections provide support and control the dimensions of the turbine disc being formed during the subsequent weaving operations. Fibers are woven in an axial direction among the radial fibers to close in the space near the paper discs until a desired thickness is obtained. The circumferential fibers are wound around the periphery of the layered axial fibers between the radial fibers until a desired thickness is obtained. Axially directed fibers are then positioned among the last-recited circumferential fibers and the layering process continues with the use of increasingly larger mold sections to support the freshly wound fibers until the disc portion of the rotor is completed.

Radial fibers extend from the periphery of the disc portion and form blade groupings. These fibers are pressed together in the circumferential direction from the disc outside diameter to the blade tip. The compression is accomplished by sacrificial blocks having contours which correspond to the shape of the blade. Prior to the insertion of the sacrificial blocks, axial fibers are woven into the radial fibers at the region of compression to provide transverse structural capability. Circumferential fibers are then wound around the sacrificial blocks to hold them in place during subsequent processing steps. At this point, a shroud which interconnects the outer ends of the blades may be provided by continuing the weaving of circumferential and axial fibers.

The molds are removed once winding is complete and the fiber skeleton is cut from the rings. A material is then infiltrated into the skeleton to provide a matrix and bond the fibers. Said matrix and fibers consist of the same material respectively.

In the preferred embodiment, carbon fibers are used and infiltrated with carbon by chemical vapor deposition or resin impregnation. Impregnation with a resin, such as pitch, provides a rotor with a superior density; however, the process requires repeated treatments with resin. Only one step is required in the vapor deposition process, in which the fiber skeleton is heated and exposed to a gas such as methane. The gas penetrates the woven fiber skeleton, thermally degrades, deposits carbon and releases hydrogen, which is removed. The resulting product in both processes is a composite turbomachinery rotor preform which consists of carbon substantially throughout.

After the matrix material has infiltrated the fiber skeleton, the sacrificial blocks are removed along with any undesired supporting fibers at the periphery. The preform is machined to its final surface and given a surface oxidation coating when necessary. The completed rotor has the desired refractory properties and improved structural integrity and durability.

DETAILED DESCRIPTION OF THE INVENTION

Figure 1:
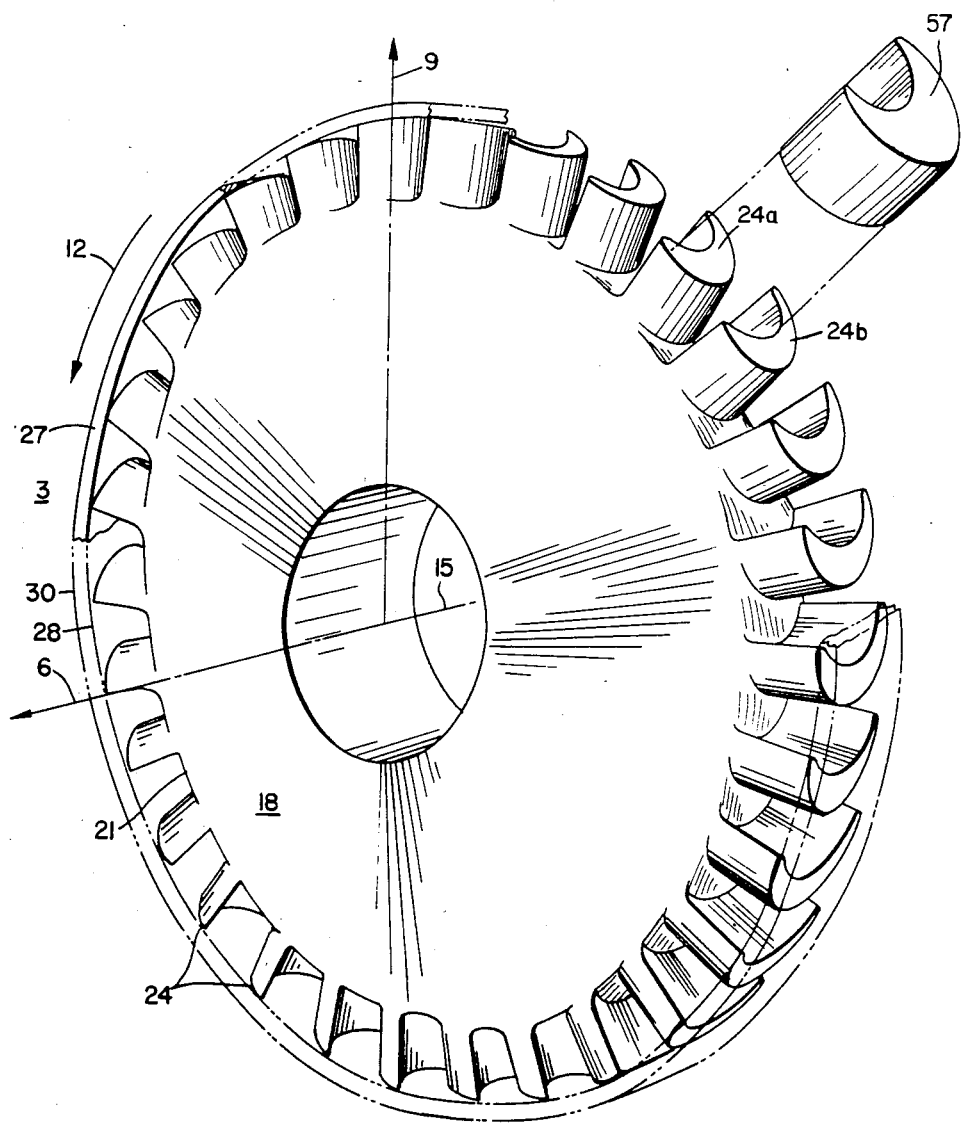
FIG. 1 is a perspective view of a preferred embodiment of a turbomachinery rotor according to the present invention.

FIG. 1 shows a completed turbomachinery rotor 3 fabricated according to the present invention and with three reference directions illustrated therein. The reference directions include an axial direction 6, a radial direction 9, and a circumferential direction 12. The rotor 3 has a central axis 15 indicated by the axial line segment shown, and comprises a disc portion 18 which is that portion contained within a circular boundary indicated as 21 and located along a predetermined distance from central axis 15, a plurality of blade portions, 24 extending outwardly in the radial direction, and may also comprise a shroud portion 27 partly shown. The shroud portion 27, if present, extends along the path defined by the peripheral, outermost ends of blade portions 24, that is, along and between dotted lines 28 and 30 which indicate the inner and outer surfaces, respectively, of shroud portion 27.

In the preferred embodiment, rotor 3 comprises a skeletal network of carbon fibers extending in the radial, circumferential and axial directions in the disc portion 18 and primarily in the radial direction in blade portions 24, although some axial fibers are preferably also present in blade portions 24. When rotor 3 additionally comprises the shroud portion 27, shroud carbon fibers extend primarily in the circumferential direction. The carbon fibers are infiltrated with carbon to provide a matrix. Thus, the entire rotor is comprised of a single material, namely carbon, some of which is in fiber form and the rest of which is the matrix material.

Figure 2:
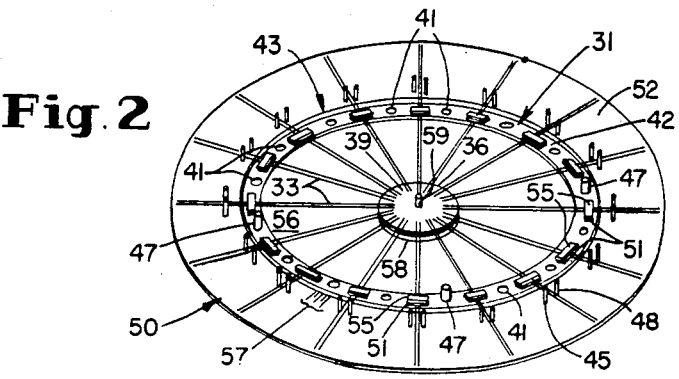
FIG. 2 is a loading fixture in the process of defining a portion of a fiber skeleton network on an annular supporting ring.

A carbon fiber rotor skeleton 31 is shown in the first stages of manufacture on a loading frame 50 in perspective view in FIG. 2. Loading frame 50 is comprised of ½" thick circular base plate 52 with a rotatable inner disc 56. Because rotatable disc 56 is 040" thinner than the base plate, it provides a recessed platform for a flat annular ring 42 of a smaller diameter. The recess is indicated in the drawing by reference numeral 43. The rotatable disc has three pins 47 which secure annular ring 42 by passing through three of the sixteen holes 41 located on the annular ring. A raised platform 58 on the rotating disc supports a paper disc 39 which is secured by a pin 59 in its center.

Manufacturing the fiber skeleton is begun by positioning the rotatable disc 56 at a desired location and placing a flat annular ring 42 on the disc. Radial fibers 33 are extended from the edge portion 36 of paper disc 39, which is located in the center of the loading frame. Fibers 33 are fastened to base plate 52 and are positioned between pairs of pegs 45 and 48. These fibers may or may not extend fully across the center of paper disc 39, depending on whether a thickness of material is desired between successive paper discs. Such a thickness would result from the mutual crossing of numerous radial fibers 33 in this region. Once positioned, the radial fibers are fastened to annular ring 42 by double backed tape 51. The fiber is then glued and vinyl tape 55 is applied over the glue. While the position of only one group of radial fibers 33 between 1 pair of pegs 45 and 48 has been described, it will be clear that several such groups, one for each blade portion 24, must be positioned.

Figure 3:
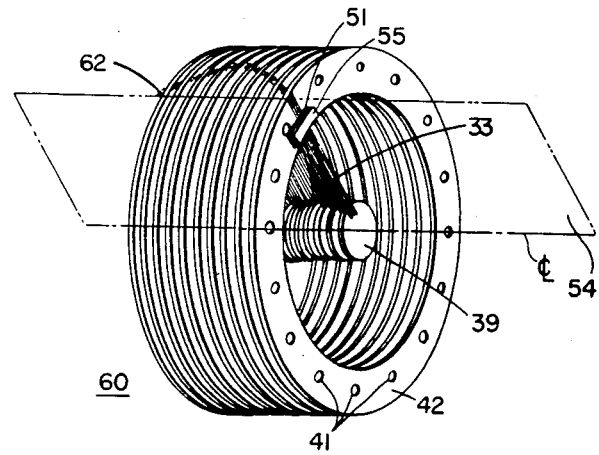
FIG. 3 illustrates, in schematic perspective, several axially aligned rings which support fiber arrays.

Once fibers 33 are secured to annular ring 42, the array 31 is removed from the loading fixture 50. The rotatable disc 56 is then moved to a new predetermined position and another fiber array is assembled. The position of the rotatable disc 56 is altered for the purpose of defining the curve of blade portion 24 when several of these arrays are stacked axially, as schematically shown in FIG. 3. To accomplish this, the rotatable disc is aligned with a series of reference indices 57 on the base plate. By positioning the rotatable disc in this fashion, the location of the starburst on the annular ring 42 is rotated with respect to the holes in ring 42. When the rings are aligned axially, by placing pins through the alignment holes 41, the outermost ends of radial fibers 33 describe a curvilinear path, such as shown by dotted line 62 in FIG. 3 instead of falling on the same radial plane, such as that designated 54 in FIG. 3.

Figure 4:
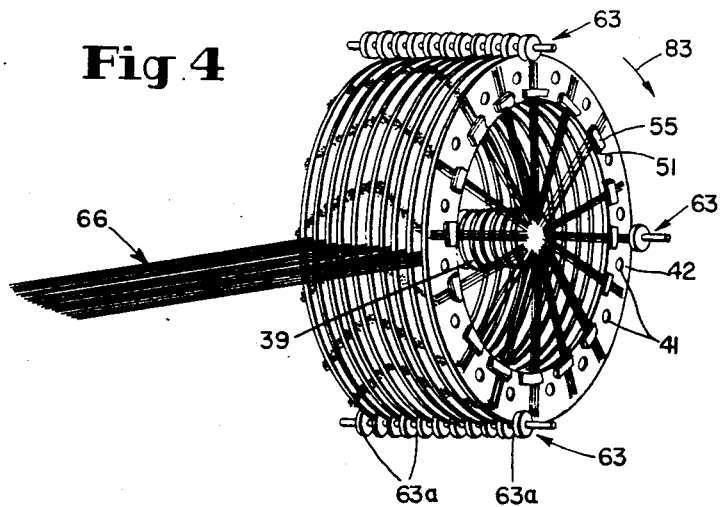
FIG. 4 is a schematic perspective view of grooved shafts supporting the axially aligned rings for the winding of fibers in the circumferential direction.

The stacked assembly of rings 60 is supported by roller supports 63 as shown in FIG. 4, at the outer rims of rings 42. Adjacent rings 42 are spaced from each other a predetermined distance by means of grooves 63a in roller supports 63. Thus, assembly 60 is supported as shown in FIG. 4 in a freely rotatable fashion, rotational movement of the assembly being controlled by shafts 63. Axial movement of the assembly is prevented by grooves 63a. A shaft 74 is installed through the center holes in the paper discs.

Figure 5:
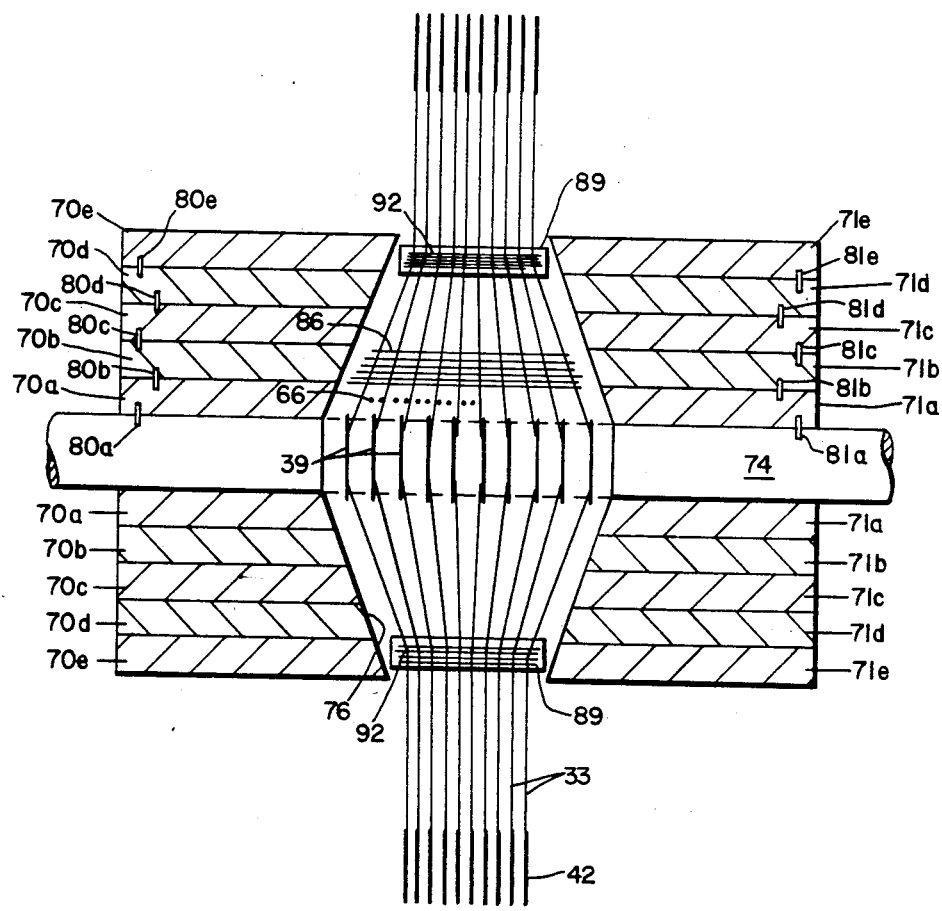
FIG. 5 is a schematic cross-sectional view of the invention in a stage of manufacture.

Axial fibers such as those indicated at 86 in FIG. 5 are woven among radial fibers 33 at the periphery of the paper discs. Circumferential fibers 66 are attached to the outer periphery of the layered axial fibers and are supplied from a source not shown. Innermost mold shells 70a and 71a are positioned coaxially with assembly 60 and are supported by shaft 74 as shown or by other suitable means (not shown). Cylindrical mold shells 70a–e and 71a–e are left and right mirror-image cylindrical elements having inner faces 76 which support the carbon fiber skeletal network as shown by the cross-sectional schematic depiction of FIG. 5. The cylindrical mold shells are held in position by removable positioning pins 80a and 81a which hold the mold shells in position on shaft 74. The assembly of annular discs 60 is rotated in the direction shown by the arrow 83 in FIG. 4, in order to wind circumferential fibers 66 around the layered axial fibers at the periphery of the paper discs. At predetermined intervals, axial fibers 86 are positioned among both the radial fibers and the circumferential fibers. When a layer of axial and circumferential fibers of sufficient thickness has been positioned by winding circumferential fibers 66 and positioning axial fibers 86 among them, cylindrical mold shells 70b and 71b are positioned adjacent to innermost mold shells 70a and 71a, respectively, and held in place by positioning pins 80b and 81b. The positioning of pairs of mold shells, the winding of circumferential fibers 66, and the placement of axial fibers 86 are repeated until a skeletal fiber network for the disc portion 18 of the turbomachinery rotor is completed. At this time, cylindrical mold shells 70e and 71e will have been positioned.

As shown in FIG. 5, radial carbon fibers 33 are not parallel in the plane of the figure. That is, the woven fiber network is thicker in the axial direction in the vicinity of shaft 74, i.e. at the inner periphery of the disc portion, than in the vicinity of mold shells 70e and 71e, at the outer periphery of the disc portion. Such a differential in thickness is desired to provide added strength in the radial direction to withstand the stress during periods of high acceleration. It should be noted that the number of circumferential fibers wound into the network per revolution of assembly 60 in the region near the shaft 74 is the same as the number per revolution in the regions farther away from the shaft as in the region near mold shells 70e and 71e. Consequently, the axial distance between neighboring circumferential fibers will decrease as the rotor narrows toward its periphery. Accordingly, it will be noted, that the relative proportions of the various types of fibers per unit volume will vary according to the position of the unit volume in the woven fiber network.

When the carbon fiber skeletal network for the disc portion 18 of the turbomachinery rotor has been completed, sacrificial blocks 89 (more clearly illustrated as 57 in FIG. 1) are inserted between circumferentially adjacent radial fiber groupings such as 24a and 24b in FIG. 1. Carbon fibers 92 can be inserted axially between the radial fibers prior to insertion of sacrificial blocks 89 in order to provide transverse structural strength. Circumferential fibers 66 are wound around the sacrificial blocks 89 for support in a manner similar to that described in connection with the winding of circumferential fibers in disc portion 18.

If a shroud portion 27 of turbomachinery rotor 3 is desired to be constructed, winding of superposed layers of circumferential fibers 66 in the region between dotted lines 28 and 30 in FIG. 1 is undertaken in a manner similar to that described for winding circumferential fibers to support the sacrificial blocks. However, axial fibers 86 are woven into the circumferential fibers periodically to provide support. Whether or not a shroud portion 27 is constructed, excess fibers extending from blade portions 24 to steel rings 42 are cut in order to free the carbon fiber skeletal network from steel rings 42 and the mold sections 70a-e and 71a-e are removed.

At this stage of manufacture rotor 3 comprises a skeletal network of axial, radial and circumferential fibers arranged for forming a disc portion 18, a plurality of radially extending blade portions 24 and, if desired, a circumferentially extending shroud portion 27 interconnecting the outer ends of the blade portions. The skeletal network is then infiltrated with carbon to provide a carbon matrix which helps bond the fibers and which results in a composite turbomachinery rotor preform constructed essentially wholly of carbon. The infiltration can be accomplished in any of several ways including chemical vapor deposition or resin impregnation.

In chemical vapor deposition the fiber network is heated and then exposed to a gas such as methane which penetrates the interstices of the skeletal fiber network, undergoes thermal cracking, deposits carbon into the fiber network, and releases hydrogen which is exhausted from the vicinity of the fiber network. During the deposition stage, central paper supports 39 become heated to a temperature sufficient to pyrolyze them and thus remove them from the fiber network.

In resin impregnation, liquid pitch or resin is forced under pressure into the interstices of the skeletal fiber network and the network is then placed in an autoclave to undergo pyrolysis similar to that in the chemical vapor deposition process described above with a similar pyrolysis of central paper supports 39. This process is repeated until a desired amount of carbon is deposited in the fiber network and a desired carbon density is achieved.

At this stage of manufacture rotor 3 comprises a network of carbon fibers infiltrated with carbon and roughly conforming to the finished configuration of a turbomachinery rotor. To achieve the finished product, sacrificial blocks 89 are removed and undesired surface irregularities are milled away. Finally, a surface oxidation step is undertaken to provide resistance to the oxidizing atmosphere of the jet engine in which the turbomachinery rotor 3 is to be used.

While a preferred embodiment of the present invention has been disclosed herein, it is to be understood that various modifications and embodiments thereof can be realized by persons skilled in the art without departing from the present invention. For example, alumina or quartz fibers can be utilized in place of the carbon fibers when forming the rotor skeleton. The skeleton is then impregnated with suspensions of the same material (alumina or quartz) to form a composite turbomachinery rotor preform constructed essentially of one material. Rotors such as these need not be treated with a surface oxidation protection and have a much longer lifetime than the conventional carbon rotor.

What is claimed is:

1. A method of manufacturing a turbomachinery rotor including disc and blade portions comprising the steps of:
    (a) providing a plurality of fiber arrays, each of said arrays being constructed by attaching the outer ends of radial fibers of each array to a ring and extending the inner ends of said fibers radially to a pyrolizable support;
    (b) positioning circumferential fibers extending in a circumferential direction among said radial fibers and within a predetermined radial distance from said central support;
    (c) positioning axial fibers among said radial fibers and extending said axial fibers in an axial direction within said predetermined radial distance from said central support;
    (d) compressing some of said radial fibers into blade groupings of predetermined shapes located radially beyond said predetermined distance from said central support;
    (e) bonding said fibers in a matrix; and
    (f) pyrolizing said pyrolizable support;

Said radial, circumferential, and axial fibers and said matrix consisting of the same material respectively and being selected from the group consisting of carbon, quartz and alumina.

2. A method of manufacturing a turbomachinery rotor including disc, blade, and shroud portions comprising the steps of:
(a) positioning a plurality of radial fiber arrays in a predetermined relationship to each other, each of said arrays being constructed by attaching the outer ends of radial fibers to a ring and extending the inner ends of said fibers radially to a pyrolizable support;
(b) positioning circumferential fibers extending in a circumferential direction among said radial fibers and within a predetermined radial distance from the center of said central support;
(c) positioning axial fibers among said radial fibers and extending said axial fibers in an axial direction within said predetermined radial distance from said center of said central support;
(d) compressing some of said radial fibers into blade groupings of predetermined shapes located radially beyond said predetermined distance from said center of said central support;
(e) positioning shroud fibers which extend in the circumferential direction and along a path described by the outermost ends of said blade groupings;
(f) positioning shroud fibers which extend in the axial direction among prepositioned shroud fibers extending in the circumferential direction within a predetermined distance from said center point;
(g) bonding said fibers in a matrix and simultaneously pyrolizing said pyrolizable supports;

Said radial, circumferential, axial, and shroud fibers and said matrix consisting of the same material respectively and being selected from the group consisting of carbon, quartz and alumina.

3. A method of manufacturing a turbomachinery rotor including disc and blade portions comprising the steps of:
(a) attaching the outer ends of radial fibers to at least one annular support, and extending the inner ends of said fibers to at least one pyrolizable central support, and attaching said inner ends to said central support;
(b) positioning circumferential fibers extending in a circumferential direction among said radial fibers and within a predetermined radial distance from said central support;
(c) positioning axial fibers among said radial fibers and extending said fibers in an axial direction within said predetermined radial distance from said central support;
(d) compressing some of said radial fibers into blade groupings of predetermined shapes located radially beyond said predetermined distance from said central support;
(e) bonding said fibers in a matrix; and
(f) pyrolizing said at least one pyrolizable support;

Said radial, circumferential, and axial fibers and said matrix consisting of the same material respectively and being selected from the group consisting of carbon, quartz and alumina.

4. A method of manufacturing a turbomachinery rotor including disc, blade, and shroud portions comprising the steps of:
(a) providing a plurality of radial fiber arrays, each constructed by attaching the outer ends of radial fibers to at least one annular support, extending the inner ends of said fibers to at least one pyrolizable central support, and attaching said inner ends to said central support;
(b) positioning circumferential fibers extending in a circumferential direction among said radial fibers and within a predetermined radial distance from the center of said central support;
(c) positioning axial fibers among said radial fibers and extending said axial fibers in an axial direction within said predetermined radial distance from said center;
(d) compressing some of said radial fibers into blade groupings of predetermined shaped located radially beyond said predetermined distance from said center;
(e) positioning shroud fibers extending in the circumferential direction and along a path described by the outermost ends of said blade groupings;
(f) positioning shroud fibers which extend in the axial direction among prepositioned shroud fibers extending in the circumferential direction within a predetermined distance from said center;
(g) bonding said fibers in a matrix; and
(h) pyrolizing said at least one pyrolizable support;

Said radial, circumferential, axial and shroud fibers and said matrix consisting of the same material respectively and being selected from the group consisting of carbon, quartz and alumina.

5. Method of manufacturing a turbomachinery rotor including disc and blade portions comprising the steps of:
(a) providing a plurality of radial fiber arrays, each constructed by attaching the outer ends of radial fibers to at least one annular support, extending the inner ends of said fibers to a pyrolizable central support, and attaching said inner ends to said central support;
(b) positioning circumferential fibers extending in a circumferential direction among said radial fibers and within a predetermined radial distance from said central support;
(c) positioning axial fibers among said radial fibers and extending said fibers in an axial direction within said predetermined radial distance from said central support;
(d) compressing some of said radial fibers into blade groupings of predetermined shapes located radially beyond said predetermined distance from said central support;
(e) positioning sacrificial blocks in the spaces between said blade groupings;
(f) bonding said fibers in a matrix;
(g) pyrolizing said at least one pyrolizable support; and
(h) removing said sacrificial blocks;

Said radial, circumferential, and axial fibers and said matrix consisting of the same material respectively and being selected from the group consisting of carbon, quartz and alumina.

6. A method of manufacturing a turbomachinery rotor including disc, blade, and shroud portions comprising the steps of:
(a) providing a plurality of radial fiber arrays, attaching the outer ends of radial fibers to at least one annular support, extending the inner ends of said fibers to at least one pyrolizable central support, and attaching the inner ends to said central support;

(b) positioning circumferential fibers extending in a circumferential direction among said radial fibers and within a predetermined radial distance from the center of said central support;
(c) positioning axial fibers among said radial fibers and extending said fibers in an axial direction within said predetermined radial distance from said center of said central support;
(d) compressing some of said radial fibers into blade groupings of predetermined shapes located radially beyond said predetermined distance from said center of said central support;
(e) positioning sacrificial blocks in the spaces between said blade groupings;
(f) positioning shroud fibers extending in the circumferential direction and along a path described by the outermost ends of said blade groupings;
(g) positioning shroud fibers extending in the axial direction among prepositioned shroud fibers extending in the circumferential direction within a predetermined distance from the center point;
(h) bonding said fibers in a matrix and simultaneously pyrolizing said at least one pyrolizable support; and
(i) removing said sacrificial blocks;

Said radial, circumferential, axial and shroud fibers and said matrix respectively consisting of the same material respectively and being selected from the group consisting of carbon, quartz and alumina.

* * * * *